May 1, 1956 F. W. AYRES ET AL 2,743,951
FLUID SEAL
Filed March 30, 1953 2 Sheets-Sheet 1

INVENTORS
FRANK W. AYRES
WILMA M. HELFRECHT
Executrix under the last will
and testament of
FRED A. HELFRECHT
BY
ATTORNEY May 1, 1956
F. W. AYRES ET AL
2,743,951
FLUID SEAL
Filed March 30, 1953
2 Sheets—Sheet 2
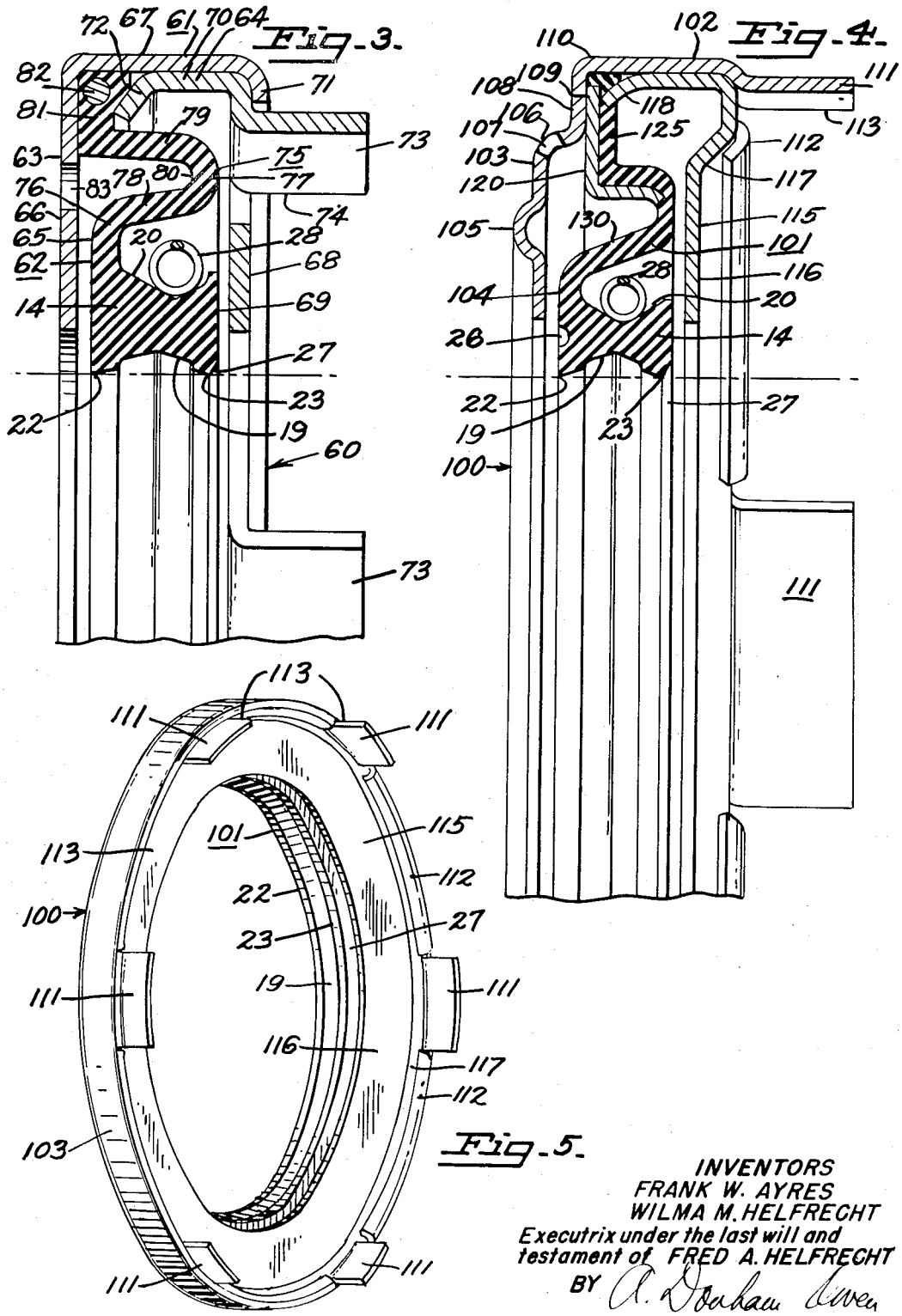
INVENTORS
FRANK W. AYRES
WILMA M. HELFRECHT
Executrix under the last will and
testament of FRED A. HELFRECHT
BY
ATTORNEY

United States Patent Office 2,743,951
Patented May 1, 1956

2,743,951

FLUID SEAL

Frank W. Ayres, Menlo Park, Calif., and Fred A. Helfrecht, deceased, late of Redwood City, Calif., by Wilma M. Helfrecht, executrix, Redwood City, Calif., assignors to National Motor Bearing Company, Inc., Redwood City, Calif., a corporation of California Application March 30, 1953, Serial No. 345,398

10 Claims. (Cl. 288—3)

This invention relates to an improved shaft seal. More particularly it relates to a shaft seal which not only retains the lubricant in the bearings but also prevents abrasive and corrosive foreign matter from reaching the bearings. The application is a continuation-in-part of our earlier filed application, Serial No. 203,826, filed January 2, 1951, which has been abandoned.

In the sealing of shafts and bearings for certain types of machinery and for railway vehicles, the exclusion of foreign matter from the bearings is a serious problem. Dust, dirt, sand, mud and other abrasive materials attack the sealing member and the shaft and interfere with the functions of the sealing member. This problem is particularly severe with railway car journals employing anti-friction bearings, where it is of prime importance to prevent abrasive foreign material from gaining access to the bearings.

A related problem encountered in such shaft seals is the exposure of the seals to water, usually in the form of rain or of mist from the road bed carried up by the strong draft caused by the motion of the cars. When water has gained access to the bearings, it has caused destructive rusting and corrosion of the highly finished surfaces.

Another problem encountered in shaft seals of this type has been to provide a seal that will take care of the relatively large amount of eccentricity which is found in railroad car axles. Such eccentricity makes it difficult to retain the lubricant sealing member in contact with the axle or shaft and to prevent the loss of lubricant. Moreover, conditions of violent pounding and vibration are also present, so that heretofore it had been considered impossible to provide a sealing member that would maintain contact at all times and still would protect the shaft and bearing from foreign material. Simple labyrinthine seals, though sufficiently rugged to withstand shock and vibration, failed to provide the desired protection from abrasive and corrosive materials.

A further problem encountered in the present invention has been how to keep the seal spaced at a substantially constant distance from the anti-friction bearings, so as to prevent it from drifting in against them.

The present invention has solved these problems by providing a type of seal in which there are two sealing lips depending from the same body portion of the flexible resilient sealing member, and in which there is a novel relation between these lips. The inner lip retains the lubricant in the bearings, and outer lip excludes foreign matter so that it cannot gain access to the inner lip. At the same time a novel structure of the sealing member provides sufficient flexibility to keep both lips in contact at all times with the axle or shaft.

The invention also includes a case member which protects the sealing member from flying stones, gravel, and so on, and which is ported so that any water which may collect against the outer sealing element is automatically drained out of the case. This case member is also provided with a plurality of inwardly-extending spacer members that prevent the seal from drifting against the anti-friction bearings.

Other objects and advantages of the invention will appear from the following description of three preferred forms thereof. These descriptions are given in detail in order to comply with U. S. Revised Statutes, section 4888, but it is not intended that the invention be limited to mere details, the scope of the invention being indicated by the appended claims.

In the drawings:

Fig. 3 is a view similar to Fig. 1 of a modified form of shaft seal.

Fig. 4 is a view similar to Fig. 1 of a further modified form of seal employing the principles of the present invention.

Fig. 5 is a view in perspective looking toward the inner face of the seal of Fig. 4.

Figure 1:
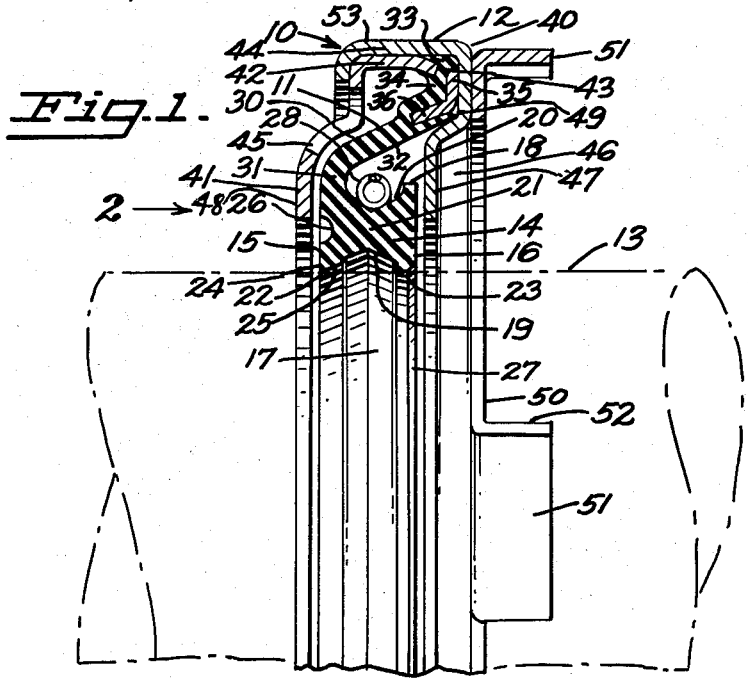
Fig. 1 is a view in elevation and in section of a portion of a shaft seal embodying the principles of the present invention. A portion of the shaft is indicated in dot-dash lines.
Figure 2:
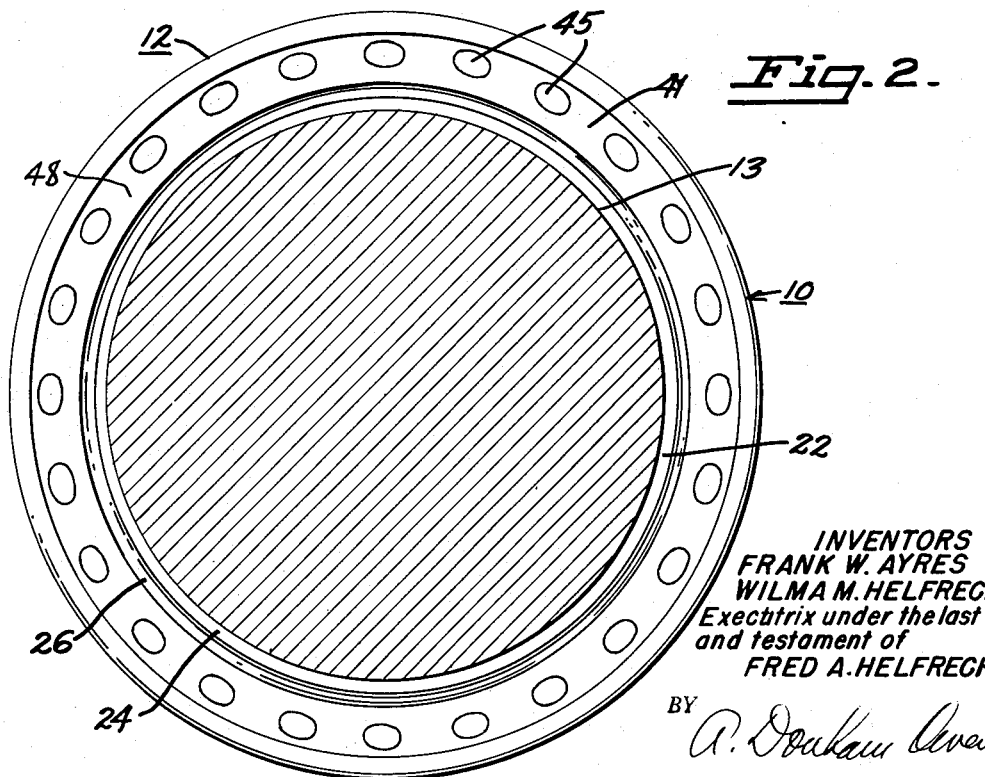
Fig. 2 is a reduced view in front elevation of the entire seal of Fig. 1, looking at it from the outside face, in the direction of the arrow 2 in Fig. 1, and showing the shaft in section.

The seal 10, shown in Figs. 1 and 2, includes a sealing member 11 held in a case 12 and engaging an axle or shaft 13. The sealing member 11, preferably constructed of neoprene rubber or some other suitable elastomer, includes a body portion 14 generally rectangular in shape; i. e., its radial faces 15 and 16 are substantially perpendicular to the shaft or axle 13. Its two axial faces 17 and 18 are provided with grooves 19 and 20, which are so proportioned that the radial thickness of the body portion 14 at its narrow point 21 will be between about one-third and about one-half of the axial extent of the body portion 14, i. e., the distance between the radial faces 15 and 16. This proportioning is an important feature of this invention and will be discussed further after other elements of the seal 10 have been described.

The axial groove 19 divides the body portion 14 so that these are two sealing lips 22 and 23, one at each axial extremity of the body portion 14. The outer lip 22 serves to exclude foreign matter such as dust, dirt, mud, abrasives, and liquids, from the inner lip 23. The outer lip 22 is in line with the radial face 15 and its outer face 24 is substantially perpendicular to the axle 13. Its inner face 25 is generally conical, so that the lip 23 has a narrow area of contact with the axle 13. If desired, in order to give the dust sealing lip 22 greater flexibility, a circumferential groove 26 may be provided in the radial face 15.

The fluid-retaining or inner lip 23 is not identical to the outer lip 22. There is no groove 26, and its inmost face 27 slopes back from the radial face 16, so that the lip 23 lies between the groove 19 and the face 16. Because of this cut-back portion 27, the sealing lip 23 can not be forced out beyond the face 16, but will retain contact with the axle at all times for insuring the retention of the lubricant in the bearings.

In the radially-outer axial recess 20 of the body member 14 there may be a garter spring 28 urging both the sealing lips 22, 23 radially inwardly against the axle 13. Inasmuch as the garter spring 28 applies a constant radial force to the section 14, which is opposed by the relative structural rigidity of the rubber in combination with the radial pressure on sealing lips 22 and 23, there is a pronounced tendency for the rubber to collapse in the manner of an over-loaded beam supported at its two ends. This undesirable action is overcome by the provision of a minimum thickness in the radial direction of about one-third the axial width of the body section 14. This thickness, however, should not exceed about one-half the axial width of the body section 14, as otherwise too great rigidity will result and the oil sealing lip 23 will not be sufficiently flexible. By the proportioning of the two grooves 19, 20 so that the thickness at the narrowest point is between one-third and one-half of the axial length of the body member 14, collapse of the body member due to the pressure of the spring 28 is prevented. At the same time there is a considerable flexibility available so that both lips 22, 23 can follow the shaft 12 at all times. It will be noted that the spring 28 is preferably located closed to the inner lip 23 than to the outer lip 22, by an amount of about 10% to 20% of the axial extent of the body portion 14, so that the fluid retaining lip 23 may be somewhat more tightly sealed.

The sealing element 11 has a flexible diaphragm or bellows 30 that includes a portion 31 which extends out radially from the body portion 14 for a short distance along the face 15 (on the same face as the dust lip 22) and then a conical portion 32 extends back axially for substantially the full axial extent of the body 14 or even beyond it. The radial diaphragm portion 31 is important for several reasons. For one thing, it helps to retain the spring 28 in place in the groove 20, whereas if the diaphragm 30 extended out conically or axially from the body 14, the spring 28 would tend to work loose. Also, the radial portion 31 enhances the flexibility of the diaphragm.

At its radially outmost end 33 the diaphragm 30 may be turned radially outwardly to provide a portion 34 which is installed against the case 12. Preferably an annular washer 35 is bonded or cemented to the radial portion 34 of the diaphragm 30, the washer 35 being provided with a flange 36 that extends inwardly along the flex section, so that the juncture with the case 12 will be perfect.

The thickness of the diaphragm 30 is preferably between about 15% and about 30% of the axial extent of the body portion 14. If it is made thinner than about 15%, it will not support the body 14 properly, and if it is made appreciably thicker than about 30%, it will not be flexible enough relative to the body 14.

Several different forms of the case for the seal are feasible for use in this invention. In Figs. 1 and 2 the case 12 of the seal 10 includes an outer case member 40 which extends radially generally parallel to the inner face 16 of the sealing member 11 and then extends axially around the outer rim of the member 11. An inner case member 41 extends radially generally parallel to the outer face 15 of the sealing member 11 and has an axial flange 42 that fits snugly inside the outer case member 40. A portion 43 of the flange 42 is dished back from the axial rim 44 of the outer case member 40 into the rubber portion 34 substantially into contact with the rigid washer 35. This structure prevents cold flow of the synthetic rubber at this point and holds the sealing member 11 tightly in the outer case element 40. Preferably, the inner case member 41 is provided with a multiplicity of holes 45, preferably about twenty-four of them (see Fig. 2), which serve as ventilation and drain ports to free the seal 10 from water and other liquids which may get in between the case member 41 and the sealing member 11. Whenever water does get in it will simply flow out those holes 45 that are at the bottom of the seal, instead of staying inside and freezing during cold weather.

The outer case member 40 has a dished-back portion 46 and a radial portion 47 whose face limits the axial swing of the sealing member 11 when it flexes on its diaphragm 30. Axial swing in the other direction is limited by the outwardly dished portion 48 of the inner case member 41.

The shaping of the outer case member 40 is also important in that the added length of the diaphragm 30 is made possible by the provision of the channel 49 well beyond the inner face 16 of the sealing member.

It is essential to provide some sort of spacing element to hold the seal 10 in its proper position. In this form of the invention this is done by a spacer ring 50 that may be spot-welded to the outer case element 40. The ring 50 has a plurality of circumferentially spaced arcuate and axially extending members 51, and lubricant is free to flow in the space 52 between the elements 51. There is no interference with the lubrication and a perfect spacing is obtained.

The elastomer employed in the flexible element 11 of our seal 10 is preferably an oil-resistant composition susceptible to molding and heat curing, such as acrylonitrile-butadiene rubber (Buna N), neoprene, polyvinylidene, rubber, polacrylic rubber, silicone rubber, etc. For most applications it is desirable that it have a hardness in the range of about 60 to 90, Shore, and preferably between about 70 to 80.

The seal case 12 is preferably made of steel, although aluminum or hard plastic can be used. If desired, the case may be covered on the peripheral surface 53 with rubber bonded thereto, facilitating installation and sealing with the housing in which the seal is installed. A seal made in accordance with the design shown in Figures 1 and 2 was tested by applying it to a shaft of 5.852" diameter and running it at speeds of 550 R. P. M., 1130 R. P. M., and 870 R. P. M., respectively. The lubricant used on the fluid side was oil, SAE 30 grade. The shaft had an eccentricity of .003" indicated run-out. The seal was provided with a garter spring of .055" coil diameter and 6.265" spring diameter. The seal ran dry for 406 hours and thereafter ran with visible oil on the sealing lip but without leaking for 959 hours, making a total running time of 1365 hours. The seal was still in good condition when it was removed from the test.

A modified form of seal 60 is shown in Fig. 3. So far as the body portion 14 is concerned, this seal 60 is identical with the seal 10 and identical numbers have been applied to it at these places. However, there are significant differences in the case 61 and in the radially outer portions of the sealing element 62 itself.

The case 61 comprises an outer case member 63 and an inner case member 64. In this instance, the outer case member 63 has a radial portion 66 parallel to the outer radial face 65 of the sealing element 62, and it has an axially-extending portion 67 that fits around the outer rim of the sealing element. There are a plurality of ports 83 through the case 63, similar to the ports 45 through the case 12. The inner case member 64 has a radial face 68 that is generally parallel to the inner face 69 of the sealing element 62 and has an axially extending portion 70 that fits snugly inside the outer case member 63. The outer case member 63 is preferably spun over at 71 to retain the inner case member 64 therein, and the inner end 72 of the inner case member 64 may be dished radially inwardly as shown, but need not extend deep into the rubber, a different means of securing the rubber being provided and described below.

Spacer elements 73 are formed integrally with the inner case member 64, as by punching out and bending out spaced portions of the case 64, as illustrated in the drawings. Spaces 74 for the lubricant to flow is left between adjacent spacer elements 73 so that they do not interfere with the functions of the seal 60.

The sealing element 62 itself has a body member 14 identical with the body member 14 of the seal 10 (except that there is no groove 26), but the diaphragm and outer ends are different. The diaphragm 75 is connected to the body portion by a substantially radial portion 76, which is generally perpendicular to the axle, and is in line with the dust sealing lip 22. From the outer end of the radially-extending portion 76, the diaphragm 75 is provided with a reverse curved portion 77 having a generally conical inner portion 78 and a generally conical outer portion 79, connected by a reverse curve 80. This reverse curve 80 gives the diaphragm 75 an increased measure of flexibility as compared with the diaphragm 30 of the seal 10. The thickness of the diaphragm portion is again substantially 15% to 30% of the axial extent of the body portion 14.

The outer end of the diaphragm 75 joins a radial extending portion 81 in which a metal ring 82 or other reinforcing element is bonded to the rubber 62. The portion 81 fits in between the outer and inner case members 63, 64, and is securely clamped between them.

Another modified form of seal 100 is shown in Figs. 4 and 5. Again the body portion 14 of the seal 100 is identical with the body portion 14 of the seal 10 and has been given the same numbers, and the differences are in the radially outer portions of the sealing element 101 and in the case member 102. In this instance as in the seal 60, the seal 100 is provided with an outer case member 103 which substantially covers the radial outer face 104 of the sealing element 101 and protects it from flying stones, gravel, etc. For greater strength the radial face of the case 103 may have an annular rib 105. A plurality of holes 106 may be provided to free the seal 100 from water, etc. The case member 103 is preferably turned axially inward at 107 and then again radially outward at 108 to provide a radial portion 109 against which the sealing element 101 may fit. The outer case member 103 then is turned axially inwardly again at 110 to extend around the outer rim of the sealing element 101.

Spacer elements 111 are formed integrally with the outer case member 103. Radially-instepped axially-extending fingers 111 are provided at intervals along the axially inner side 112 of the outer case member 103. In between these spacer members 111, portions are punched from the outer case member 103 leaving spaces 113 through which the lubricant is free to pass. The stump portions 112 are preferably turned in radially enough to help clamp the inner case member 115 in place. This case construction has considerable advantages over the other case constructions shown, in its ease of manufacture and in the positive location of the spacing members 111. The spot welding of the Fig. 1 device becomes unnecessary, and the punching and bending out operations, needed in the Fig. 3 device, are avoided. The seal 100 is therefore relatively easy to make in large quantity, without special welding equipment. The punching can be done on an ordinary punch press, much more easily than the bent-out tabs 73 shown in Fig. 3.

The inner case member 115 may be provided with a radial face 116 which is flared at 117 and then is turned out axially and is dished at 118, so that it engages the sealing element 101. As in the seal 10, a generally L-shaped washer 120 may be provided which is bonded to the sealing element 101, and the dished-in flange 118 of the inner case member 115 may be forced into the rubber 101 substantially into engagement with the washer 120.

The outer radial portion 125 of the sealing element 101 may be connected with the body member 14 by a reverse-curve type of diaphragm 130. The diaphragm 130 is somewhat more flexible than the diaphragm 30 shown in Figs. 1 and 2 and somewhat less flexible than the diaphragm 75 shown in Fig. 3.

Like all forms of the invention, the dust sealing lip 22 excludes the dust and the oil-retaining lip 23 holds the oil in. The outer and inner case members 103, 115 again serve to limit the axial swing of the sealing element 101 as well as giving it protection from the stones, water, and other foreign matter.

We claim:

1. A shaft seal for retaining lubricant in a bearing while simultaneously excluding abrasive and corrosive foreign matter therefrom, including in combination a flexible sealing element having an annular body portion that is generally rectangular in cross section with its axial faces recessed in toward each other to provide two axially spaced apart sealing lips on the radially inner axial face, an outer lip to exclude foreign matter and an inner lip to retain the lubricant; said sealing element having a diaphragm portion extending radially outward from the axially and radially outer side of said body portion and then forming a generally conical portion for substantially the full axial extent of said sealing element; a spring in the outer axial recess of said body portion; an annular case for said sealing element extending around the outside thereof for the axial extent of said seal and having radial faces on opposite sides of said sealing element, the outer radial face having a multiplicity of perforations around its circumference for freeing the outer face of liquid and other foreign matter, the radial face on the inner side thereof having a plurality of circumferentially-spaced axially-extending spacer elements.

2. A shaft seal for retaining lubricant in a bearing while simultaneously excluding abrasive and corrosive foreign matter therefrom, including in combination a flexible sealing element having an annular body portion that is generally rectangular in cross section with its radial faces perpendicular to the axis and with its axial faces recessed in toward each other, the radially inner axial rim thereby providing two axially spaced-apart sealing lips, an outer lip to exclude foreign matter and an inner lip to retain the lubricant; the two recesses of the axial faces being so proportioned that the thinnest radial dimension of said body portion is between one-third and one-half the axial length of said body portion; said sealing element having a diaphragm portion extending radially outward from the axially and radially outer side of said body portion, said diaphragm portion being curved back therefrom to form a generally conical portion extending back axially for substantially the full axial extent of said sealing element and terminating in an outermost radially-outward-extending portion; said diaphragm portion having a thickness between 15% and 30% of the axial extent of said body portion; a spring in the outer axial recess of said body portion; an annular case for said sealing element extending around the outside thereof for the axial extent of said seal and having radial faces on opposite sides of said sealing element, the outer radial face having a multiplicity of perforations around its circumference for freeing the outer face of liquid and other foreign matter, the radial face on the inner side thereof having a plurality of circumferentially-spaced axially-extending spacer elements.

3. A shaft seal for retaining lubricant in a bearing while simultaneously excluding abrasive and corrosive foreign matter therefrom, including in combination a flexible sealing element having an annular body portion that is generally rectangular in cross section with its radial faces perpendicular to the axis and with its axial faces recessed in toward each other, the radially inner axial rim thereby providing two axially spaced-apart sealing lips, an outer lip to exclude foreign matter and an inner lip to retain the lubricant, said inner lip having its edge cut back in conically from its said radial face so that the sealing surface is axially outward of its adjacent radial face; the two recesses of the axial faces being so proportioned that the thinnest radial dimension of said body portion is between one-third and one-half the axial length of said body portion; said sealing element having a diaphragm portion extending radially outward from the axially and radially outer side of said body portion, said diaphragm portion being curved back therefrom to form a generally conical portion extending outwardly from said radially-outward extending portion and extending back axially for substantially the full axial extent of said sealing element and terminating in an outermost radially-outward-extending portion; said first-mentioned radially-extending portion and said conical portion having a thickness between 15% and 30% of the axial extent of said body portion; a spring in the outer axial recess of said body portion; an annular case for said sealing element extending around the outside thereof for the axial extent of said seal and having radial faces on opposite sides of said sealing element, the outer radial face having a multiplicity of perforations around its circumference for freeing the outer face of liquid and other foreign matter, the radial face on the inner side thereof having a plurality of circumferentially-spaced axially-extending spacer elements.

4. A shaft seal for retaining lubricant in a bearing while simultaneously excluding abrasive and corrosive foreign matter therefrom, including in combination a flexible sealing element having an annular body portion that is generally rectangular in cross section with its radial faces generally perpendicular to the axis and with concave axial faces, said element having two axially spaced apart sealing lips on its radially inner axial face, an outer lip to exclude foreign matter and an inner lip to retain the lubricant, said sealing element having a diaphragm portion extending radially outward from said body portion, said diaphragm portion being curved back therefrom to form a generally conical portion terminating in an outermost radially-outward extending portion; a spring in the outer concave axial face of said body portion; an annular case for said sealing element extending around the axial extent of said seal and having radial faces on opposite sides of said sealing element, the outer radial face having a multiplicity of perforations around its circumference for freeing the outer face of liquid and other foreign matter, the radial face on the inner side thereof having a plurality of circumferentially-spaced axially-extending spacer elements.

5. The seal of claim 4 in which said case includes an outer case member and an inner case member clamped inside said outer case member, one of said case members having its radial face outside said foreign matter excluding lip and the other said case member having its radial face adjacent said lubricant-retaining lip, for limiting the axial swing of said sealing element.

6. The seal of claim 5 in which the outer case member is the one adjacent said lubricant-retaining lip and in which the spacer elements comprise a plurality of spaced-apart arcuate fingers extending axially from adjacent the radially outer and axial inner edge of said outer case member.

7. The seal of claim 5 in which the inner case member is adjacent said lubricant-sealing lip and in which said inner case member is punched to provide a plurality of tabs adjacent its radially outer edge and the tabs are bent out to provide spacer elements.

8. The seal of claim 5 in which the outer case member has its radial portion adjacent the foreign-matter-excluding lip and in which said spacer elements are integral with the axial portion of said outer case member, portions being punched out between said spacer elements to give the oil freedom of movement.

9. A shaft seal, including in combination a flexible sealing element having a body portion that is substantially rectangular in cross section with radial faces and a circular axially extending inner face recessed centrally to provide two axially spaced-apart sealing lips, an outer dust-sealing lip with its outer radial face substantially perpendicular to the shaft and an inner fluid-sealing lip with its inner radial face cut back to place the sealing surface axially outward of said inner radial face, said body portion having a grooved outer rim and cooperating with said central recess so that the body portion between said lips is between one-third and one-half of the axial length of said sealing element; said sealing element having a flexing portion extending radially outwardly from the dust-sealing side of said body portion and then extending outward conically across substantially the axial length of said body portion to an anchored portion; a spring in said groove of said body portion for said sealing element; a case for said sealing element, to which said anchored portion is held; and a plurality of spacer elements extending axially beyond the fluid side of said case from portions of the circumference thereof.

10. A shaft seal, including in combination a flexible sealing element having a body portion that is substantially rectangular in cross section with radial faces and a circular axially extending inner face recessed centrally to provide two axially spaced-apart sealing lips, an outer dust-sealing lip with its outer radial face substantially perpendicular to the shaft and an inner fluid-sealing lip with its inner radial face cut back to place the sealing surface axially outward of said inner radial face, said body portion having a circular groove in its outer rim cooperating with said centrally recessed portion of said axially extending inner face to define a narrow body portion between said lips, said sealing element also having a flexing portion extending radially outwardly from the dust-sealing side of said body portion and then extending conically across substantially the axial length of said body portion to an anchored portion of said sealing element; a spring in said groove urging said lips radially inward; and a metal case for said sealing element, having an axial peripheral portion radially beyond said sealing element, to one end of which said anchored portion is secured in a leak-tight fit, said case also having radial portions beyond each axial end of said sealing element.

References Cited in the file of this patent

UNITED STATES PATENTS

| 2,213,116 | Bernstein | Aug. 27, 1940 |
| 2,482,029 | Reynolds | Sept. 13, 1949 |
| 2,574,062 | Reynolds | Nov. 6, 1951 |
| 2,657,080 | Johnson et al. | Oct. 27, 1953 |
| 2,692,783 | Foss | Oct. 26, 1954 |

FOREIGN PATENTS

| 502,115 | Great Britain | Mar. 13, 1939 |
| 543,015 | Great Britain | Feb. 5, 1942 |
| 546,260 | Great Britain | July 3, 1942 |
| 562,456 | Great Britain | July 3, 1944 |
| 713,503 | Germany | Nov. 8, 1941 |